US012547197B2

(12) United States Patent
Vargas et al.

(10) Patent No.: US 12,547,197 B2
(45) Date of Patent: Feb. 10, 2026

(54) LOW DROPOUT REGULATOR WITH HYBRID VOLTAGE REGULATION CIRCUIT

(71) Applicant: Apple Inc., Cupertino, CA (US)

(72) Inventors: Adrien F. Vargas, Munich (DE); Timo W. Gossmann, Neubiberg (DE); Sebastian Reinhold, Munich (DE)

(73) Assignee: Apple Inc., Cupertino, CA (US)

( * ) Notice: Subject to any disclaimer, the term of this patent is extended or adjusted under 35 U.S.C. 154(b) by 501 days.

(21) Appl. No.: 18/099,752

(22) Filed: Jan. 20, 2023

(65) Prior Publication Data

US 2024/0248504 A1 Jul. 25, 2024

(51) Int. Cl.

| | |
|---|---|
| ***G05F 1/59*** | (2006.01) |
| ***G05F 1/56*** | (2006.01) |
| ***G11C 5/14*** | (2006.01) |
| ***G11C 7/10*** | (2006.01) |
| ***H03F 3/45*** | (2006.01) |
| ***H04B 1/40*** | (2015.01) |

(52) U.S. Cl.

CPC .................................... *G05F 1/59* (2013.01); *H04B 1/40* (2013.01)

(58) Field of Classification Search

None

See application file for complete search history.

(56) References Cited

U.S. PATENT DOCUMENTS

| | | | | |
|---|---|---|---|---|
| 8,692,528 | B2 * | 4/2014 | Wang | G05F 1/575 323/280 |
| 8,692,529 | B1 * | 4/2014 | Wyatt | G05F 1/56 323/280 |
| 9,229,464 | B2 * | 1/2016 | Buescher | G05F 1/56 |
| 9,746,864 | B1 * | 8/2017 | Narang | H04B 1/04 |
| 10,025,333 | B2 * | 7/2018 | Maeng | G05F 1/575 |
| 10,152,072 | B1 * | 12/2018 | Elhebeary | G05F 1/468 |
| 10,429,868 | B2 * | 10/2019 | Elhebeary | G05F 1/575 |
| 10,698,432 | B2 | 6/2020 | Shih et al. | |
| 10,739,846 | B2 | 8/2020 | Kapoor et al. | |
| 10,852,756 | B2 * | 12/2020 | Luria | G05F 1/56 |
| 10,908,673 | B2 | 2/2021 | Meinerzhagen et al. | |
| 10,915,121 | B2 * | 2/2021 | Magod Ramakrishna | G05F 1/565 |
| 11,003,202 | B2 * | 5/2021 | Golara | G05F 1/575 |
| 11,120,845 | B2 * | 9/2021 | Tang | G11C 7/10 |

(Continued)

OTHER PUBLICATIONS

Punith R. Surkanti et al., "Flipped Voltage Follower Low Dropout (LDO) Voltage Regulators: A Tutorial Overview," IEEE, Jan. 6-10, 2018, https://wordpress.nmsu.edu/pfurth/files/2020/07/Flipped-VoltageFollowerLDOTutorial-VLSID-2018.pdf, 7 pages.

*Primary Examiner* — Tuan A Tran

(74) *Attorney, Agent, or Firm* — FLETCHER YODER PC

(57) ABSTRACT

This disclosure is directed to a hybrid low dropout voltage regulator circuit, hereinafter referred to as the LDO, including a flipped voltage follower (FVF), coarse grain voltage adjustment circuitry, and fine grain voltage adjustment circuitry. The LDO may provide an output voltage based on receiving a reference voltage. The flipped voltage follower may supply the output voltage to one or more other electronic circuits. The coarse grain voltage adjustment circuitry and the fine grain voltage adjustment circuitry may adjust the output voltage based on a desired voltage level. The LDO may use feedback signals, feedforward signals, or both to provide the output voltage.

20 Claims, 7 Drawing Sheets

(56) References Cited

U.S. PATENT DOCUMENTS

| | | | | |
|---|---|---|---|---|
| 11,146,262 | B1 * | 10/2021 | Wang | H03K 17/162 |
| 11,171,522 | B2 | 11/2021 | Jia et al. | |
| 11,249,501 | B2 * | 2/2022 | Fort | G05F 1/575 |
| 11,314,269 | B2 * | 4/2022 | Kimura | G05F 1/571 |
| 11,480,986 | B2 * | 10/2022 | Golara | H03F 3/45183 |
| 11,742,012 | B2 * | 8/2023 | Ramanan | G11C 13/003<br>365/158 |
| 11,886,215 | B2 * | 1/2024 | Fiocchi | G05F 1/575 |
| 11,940,830 | B2 * | 3/2024 | Jung | G11C 11/4093 |
| 12,066,849 | B2 * | 8/2024 | Roh | G11C 5/148 |
| 12,107,557 | B2 * | 10/2024 | Gruber | G05F 1/575 |
| 12,135,573 | B2 * | 11/2024 | Abbasi | G05F 1/468 |
| 12,153,459 | B2 * | 11/2024 | Xiao | G05F 1/563 |
| 12,298,795 | B2 * | 5/2025 | Kathuria | H03F 3/45192 |
| 12,332,674 | B2 * | 6/2025 | Upadhyaya | G05F 1/59 |
| 2016/0259354 | A1 * | 9/2016 | Maeng | G06F 1/26 |
| 2019/0171243 | A1 * | 6/2019 | Elhebeary | G05F 1/59 |
| 2020/0012308 | A1 * | 1/2020 | Chen | G05F 3/30 |
| 2021/0240212 | A1 * | 8/2021 | Kimura | G05F 1/575 |
| 2022/0103142 | A1 | 3/2022 | Gruber et al. | |
| 2022/0383925 | A1 * | 12/2022 | Ramanan | G11C 13/003 |
| 2023/0045744 | A1 * | 2/2023 | Jung | G11C 11/4093 |
| 2023/0057178 | A1 * | 2/2023 | Roh | H03F 3/34 |
| 2023/0367344 | A1 * | 11/2023 | Upadhyaya | G05F 1/565 |
| 2024/0143007 | A1 * | 5/2024 | Kathuria | G05F 1/59 |

* cited by examiner

LOW DROPOUT REGULATOR WITH HYBRID VOLTAGE REGULATION CIRCUIT

BACKGROUND

The present disclosure relates generally to wireless communication, and more specifically to filtering out-of-band frequency signals from an input signal.

An electronic device may include a number of electronic components and voltage regulators. A voltage regulator may provide supply voltage and load current to one or more of the electronic components during operation of the electronic device. In some cases, it may be desirable to decrease a size of the electronic device. However, the voltage regulators may take up a significant amount of space in the electronic device. Moreover, one or more electronic components operating at higher operating frequencies may benefit from receiving more stable supply voltage and/or load current across a range of process and temperature variations. As such, voltage regulators with stable supply voltage, more stable load current, and/or reduced size is desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a low dropout voltage regulator circuit is described. The low dropout voltage regulator circuit may include flipped voltage follower circuitry including a first device configured to provide an output voltage of the low dropout voltage regulator circuit. Additionally, the low dropout voltage regulator circuit may include a first digital-to-analog converter (DAC) including a multiplexer coupled to the first device of the flipped voltage follower circuitry. The low dropout voltage regulator circuit may also include a second DAC including a plurality of switches configured to couple and uncouple the first device and a ground connection. Further, the low dropout voltage regulator circuit may include voltage regulation circuitry coupled to the multiplexer, the plurality of switches, and the first device.

In another embodiment, a method is described. The method may include receiving, by processing circuitry, instructions to set an output voltage of a low dropout voltage regulator circuit to a first voltage. Additionally, the method may include adjusting, by a current digital-to-analog converter (DAC), a current flow through a flipped voltage follower. Further, the method may include adjusting, by a voltage DAC, an input voltage of the flipped voltage follower. Additionally, the method may include providing, by the flipped voltage follower, the output voltage at the first voltage.

In yet another embodiment, a radio frequency (RF) transceiver is described. The RF transceiver may include a transmission digital-to-analog converter (DAC) configured to provide analog signals for transmission via one or more antennas based on receiving a supply voltage. Additionally, the RF transceiver may include a low dropout voltage regulator circuit including flipped voltage follower circuitry configured to provide the supply voltage. The low dropout voltage regulator circuit may also include a voltage DAC including a multiplexer coupled to the flipped voltage follower circuitry. Additionally, the low dropout voltage regulator circuit may include a current DAC including a plurality of switches configured to couple and uncouple the flipped voltage follower circuitry and a ground connection. Further, the low dropout voltage regulator circuit may include voltage regulation circuitry coupled to the multiplexer, the plurality of switches, and the flipped voltage follower circuitry.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
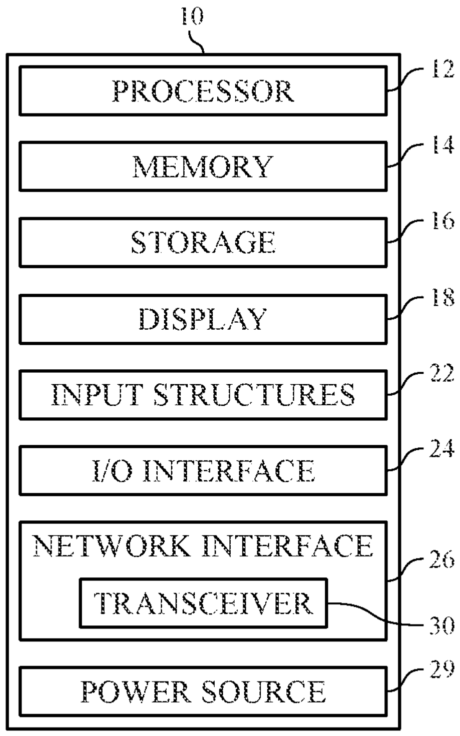
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including." and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately." "near." "about." "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to a hybrid low dropout voltage regulator circuit, hereinafter referred to as the LDO, including a flipped voltage follower (FVF), coarse grain voltage adjustment circuitry, and fine grain voltage adjustment circuitry. The LDO may provide an output voltage based on receiving a reference voltage. The flipped voltage follower may supply the output voltage to one or more other circuits. The coarse grain voltage adjustment circuitry and the fine grain voltage adjustment circuitry may adjust the output voltage based on a desired voltage level.

The coarse grain voltage adjustment circuitry and the fine grain voltage adjustment circuitry may initially ramp-up the output voltage to the desired voltage level. Alternatively or additionally, the coarse grain voltage adjustment circuitry and the fine grain voltage adjustment circuitry may compensate for over-voltage or under-voltage conditions of the output voltage compared to the desired voltage level. The over-voltage or under-voltage conditions may be caused by manufacturing process variations, operating temperature fluctuations, and/or variations or fluctuations of the reference voltage, among other things.

The fine grain voltage adjustment circuitry may adjust the output voltage of the LDO more granularly compared to the coarse grain voltage adjustment circuitry. The coarse grain voltage adjustment circuitry may adjust the output voltage of the LDO based on adjusting a gate voltage of an output device (e.g., a switch, a transistor) of the flipped voltage follower. For example, the coarse grain voltage adjustment circuitry may include a resistor string coupled to the reference voltage and a multiplexer. The multiplexer may provide the gate voltage by coupling a gate of the output switch to a selected resistor of the resistor string. The multiplexer may adjust the gate voltage by coupling the gate of the output switch to a different resistor of the resistor string.

Moreover, the fine grain voltage adjustment circuitry may adjust the output voltage of the LDO based on adjusting a current flow through the output switch of the flipped voltage follower. For example, the fine grain voltage adjustment circuitry may include multiple switches coupling the output switch to (or decoupling the output switch from) a ground connection. As such, closing (or opening) different number of switches of the fine grain voltage adjustment circuitry may cause drawing a different amount of current to the ground connection.

In some embodiments, a controller may provide control signals to the coarse grain voltage adjustment circuitry and the fine grain voltage adjustment circuitry to adjust the output voltage. In particular, the controller may provide the control signals to the multiplexer of the coarse grain voltage adjustment circuitry and the switches of the fine grain voltage adjustment circuitry to adjust the output voltage. The controller may provide the control signals based on receiving a feedback signal from the output voltage, receiving a feedforward signal from an external device, or both. In some embodiments, the LDO may include the controller. In alternative or additional embodiments, the controller may be disposed external to the LDO.

In any case, the flipped voltage follower may supply the output voltage to one or more circuits. In some cases, an electronic device may include the LDO and/or the one or more components coupled thereto. For example, the LDO may supply the output voltage to one or multiple circuits of a receiver and/or a transmitter of a radio frequency (RF) circuit in an electronic device. It should be appreciated that the LDO may supply the output voltage to any viable circuit of an electronic device.

With this in mind, FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc, of Cupertino, California), a portable electronic or handheld electronic device such as a wireless electronic device or smartphone (e.g., in the form of a model of an iPhone® available from Apple Inc, of Cupertino, California), a tablet (e.g., in the form of a model of an iPad® available from Apple Inc, of Cupertino. California), a wearable electronic device (e.g., in the form of an Apple Watch R by Apple Inc, of Cupertino. California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with the memory 14 and the nonvolatile storage 16 to perform various algorithms. Programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc, of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a 3$^{rd}$ generation (3G) cellular network, universal mobile telecommunication system (UMTS), 4$^{th}$ generation (4G) cellular network, long term evolution (LTE®) cellular network, long term evolution license assisted access (LTE-LAA) cellular network, 5$^{th}$ generation (5G) cellular network, and/or New Radio (NR) cellular network, a 6$^{th}$ generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mmWave) frequency range (e.g., 24.25-300 giga-hertz (GHz)) that defines and/or enables frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
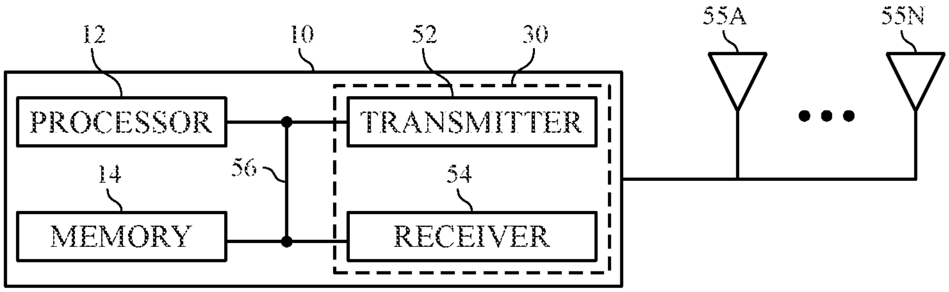
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations or access points) or a direct connection. As illustrated, the transmitter 52 and the receiver 54 may be combined into the transceiver 30. In some cases, the transmitter, the receiver, or both may include various circuitry including a splitter and/or a combiner.

The electronic device 10 may also have the antenna 55 electrically coupled to the transceiver 30. The antenna 55 may be configured in an omnidirectional or directional configuration, in a single-beam, dual-beam, or multi-beam arrangement, and so on. Each antenna of the antennas 55A-55N may be associated with one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
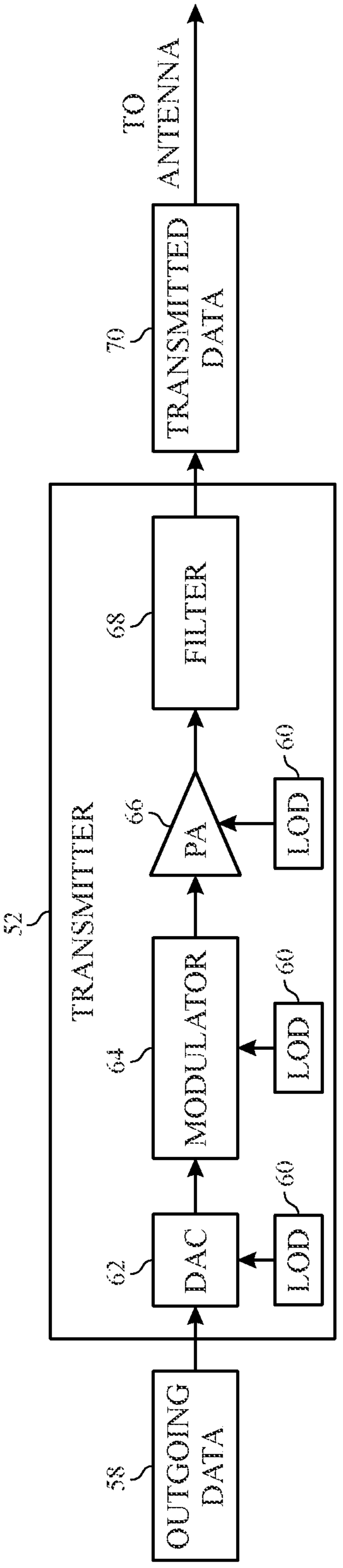
FIG. 3 is a schematic diagram of a transmitter of the electronic device of FIG. 1 including a hybrid low dropout voltage regulator circuit, hereinafter referred to as the LDO, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 58 in the form of a digital signal to be transmitted via the antenna 55. A hybrid low dropout voltage regulator circuit 60, hereinafter referred to as the LDO 60, may provide an output voltage (or supply voltage) to one or more components of the transmitter 52. The LDO 60 may include circuitry to regulate the output voltage based on a desired voltage range. For example, the LDO 60 may set the output voltage to a voltage level within the desired voltage range upon activation and maintain the output voltage by stepping the output voltage up or down (e.g., increasing or decreasing the output voltage) by coarse or fine voltage levels, as will be appreciated. For example, the LDO 60 may provide the output voltage to one or more of a digital-to-analog converter (DAC) 62, a modulator 64, and a power amplifier (PA) 66. The LDO 60 may include a flipped voltage follower (FVF), coarse grain voltage adjustment circuitry, and fine grain voltage adjustment circuitry, as will be appreciated.

The DAC 62 of the transmitter 52 may convert the digital signal to an analog signal. Moreover, the modulator 64 may combine the analog signal with a carrier signal to generate a radio wave. The PA 66 receives the modulated analog signal from the modulator 64. The PA 66 may amplify the modulated analog signal to a suitable level to drive transmission of the signal via the antenna 55. A filter 68 (e.g., filter circuitry and/or software) of the transmitter 52 may then remove undesirable noise from the amplified analog signal to generate transmitted data 70 to be transmitted via the antenna 55.

Additionally, the transmitter 52 may include any suitable additional components not shown, or may not include certain of the illustrated components, such that the transmitter 52 may transmit the outgoing data 70 via the antenna 55. For example, the transmitter 52 may include a mixer and/or a digital up converter. As another example, the transmitter 52 may not include the modulator 64 in cases where the DAC 62 outputs the radio wave (e.g., the DAC 62 combines the analog signal with the carrier signal).

Figure 4:
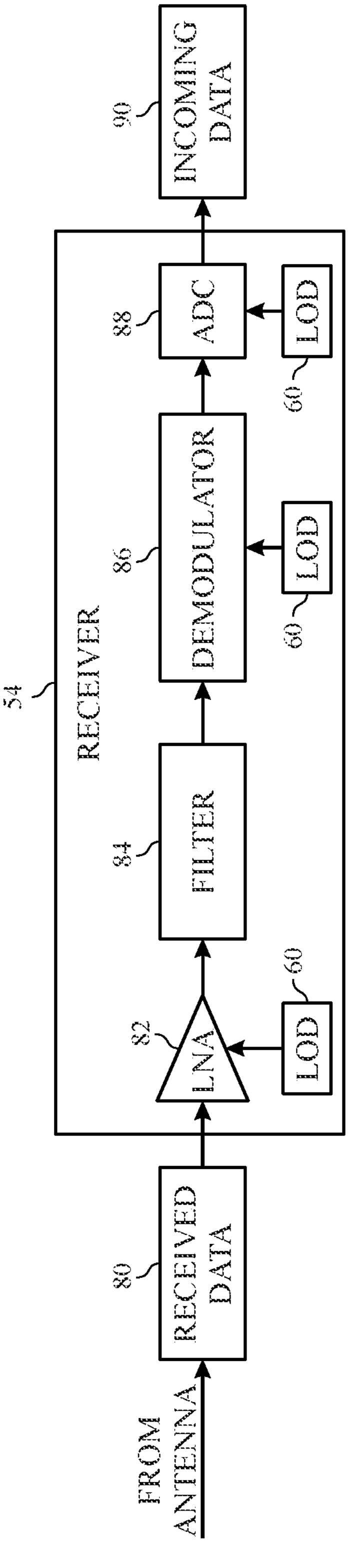
FIG. 4 is a schematic diagram of a receiver of the electronic device of FIG. 1 including the LDO, according to embodiments of the present disclosure.

FIG. 4 is a schematic diagram of the receiver 54 (e.g., receive circuitry), according to embodiments of the present disclosure. As illustrated, the receiver 54 may receive received data 80 from the antenna 55 in the form of a number of analog signals. The receiver 54 may also include the LDO 60. For example, the receiver 54 may share the LDO 60 of the transmitter 52 or include a separate LDO 60. In any case, the LDO 60 may provide an output voltage to one or more of a low noise amplifier (LNA) 82, a demodulator 86, and an analog-to-digital converter (ADC) 88. The LNA 82 may amplify the received analog signals to a suitable level for the receiver 54 to process.

A filter 84 (e.g., filter circuitry and/or software) may remove undesired noise from the received analog signals, such as cross-channel interference. The filter 84 may also remove one or more additional analog signals received by the antenna 55 that are at frequencies other than a desired signal. The demodulator 86 may remove a radio frequency envelope and/or extract a demodulated analog signal from the combined analog signal for processing. The ADC 88 may receive the demodulated analog signal and convert the received signal to a digital signal of incoming data 90 to be further processed by the electronic device 10. Additionally, the receiver 54 may include any suitable additional components not shown, or may not include certain of the illustrated components, such that the receiver 54 may receive the received data 80 via the antenna 55. For example, the receiver 54 may include a mixer and/or a digital down converter.

Figure 5:
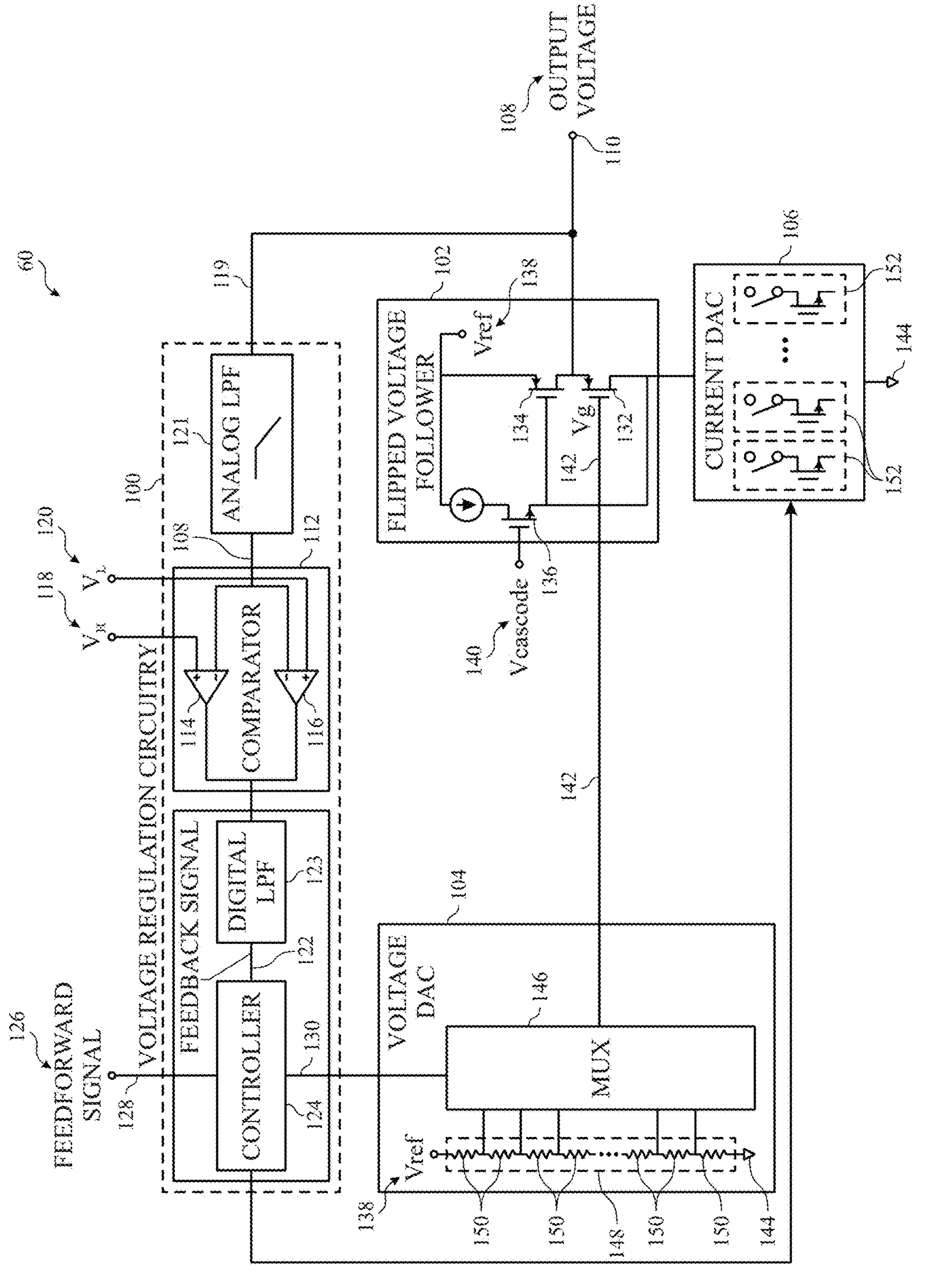
FIG. 5 is a circuit diagram of the LDO of FIGS. 3 and 4, according to embodiments of the present disclosure.

FIG. 5 is a circuit diagram of the LDO 60 according to some embodiments of the present disclosure. The LDO 60 may include voltage regulation circuitry 100, a flipped voltage follower 102, a voltage DAC 104 (e.g., coarse grain voltage adjustment circuitry), and a current DAC 106 (e.g., fine grain voltage adjustment circuitry). The LDO 60 may provide an output voltage 108 (or output voltage level 108) via an output port 110 based on a desired voltage range during operation. For example, the LDO 60 may ramp-up the output voltage 108 upon activation (e.g., from an idle or deactivated mode) or compensate for voltage level fluctuations during operation to provide the output voltage 108 within the desired voltage range.

The voltage regulation circuitry 100 may include comparator circuitry 112 to determine whether the output voltage 108 is within the desired voltage range during operation. The comparator circuitry 112 may include a first comparator 114 (e.g., an operational amplifier) and a second comparator 116. In the depicted embodiment, a non-inverting input of the first comparator 114 may receive a high voltage threshold 118 ($V_H$) (e.g., 100 millivolts (mV), 500 mV, 850 mV, 5 Volts (V), 20 V, and so on) of the desired voltage range from a high voltage threshold source. A non-inverting input of the second comparator 116 may receive a low voltage threshold 120 ($V_L$) (e.g., 50 millivolts (mV), 400 mV, 750 mV, 5 Volts (V), 20 V, and so on) of the desired voltage range from a low voltage threshold source. The low voltage threshold 120 may have a lower voltage level compared to the high voltage threshold 118. For example, the inverting inputs of the first comparator 114 and the second comparator 116 may receive a filtered output voltage 108 via a feedback path 119 including an analog low-pass filter 121.

The first comparator 114 may provide an indication of an over-voltage condition when the output voltage 108 (or the indication of the output voltage 108) is equal to or above the high voltage threshold 118. Moreover, the second comparator 116 may provide an indication of an under-voltage condition when the output voltage 108 (or the indication of the output voltage 108) is equal to or below the low voltage threshold 120. As such, the comparator circuitry 112 may provide one or more feedback signals 122 indicative of the over-voltage condition or the under-voltage condition to a controller 124 of the voltage regulation circuitry 100. In some cases, the comparator circuitry 112 may provide the feedback signals 122 to the controller 124 via a digital low-pass filter 123. The digital low-pass filter 123 may include a finite impulse response (FIR) filter, infinite impulse response (IIR) filter, or any other viable digital signal filtering circuitry, among other things.

In some embodiments, the processor 12 may include at least a portion of the controller 124. Alternatively or additionally, the controller 124 may include processor circuitry, any viable form of logic circuitry, or a combination of both. The controller 124 may receive the feedback signals 122 from the comparator circuitry 112 and feedforward signals 126 from one or more circuits external to the LDO 60 via a feedforward path 128. In specific embodiments, the processor 12 or any viable circuitry may provide the feedforward signals 126 to the controller 124. The feedforward signals 126 may indicate activation of the LDO 60 (e.g., when initially in idle mode) and/or indicate a change in the output voltage 108 of the LDO 60.

In some embodiments, the LDO 60 may supply the output voltage 108 to multiple electronic circuits coupled thereto. In some cases, one or more of such electronic circuits may be initially idle or deactivated. In such cases, the LDO 60 may initially supply the output voltage 108 to the activated electronic circuits. If not compensated for, subsequently activating (or deactivating) one or more of the electronic circuits coupled to the LDO 60 may decrease or drop (or increase or bump) the output voltage 108. In particular, a change in current consumption of the additional electronic circuits may drop (or bump) the output voltage 108. In some embodiments, the feedforward signals 126 may indicate increasing (or decreasing) the output voltage 108 when activating (or deactivating) the electronic circuits coupled to the LDO 60. Alternatively or additionally, the feedback signals 122 may indicate increasing or decreasing the output voltage 108 based on detecting the drop or the bump in the output voltage 108 below the low voltage threshold 120 or above the high voltage threshold 118.

In any case, in different cases, the controller 124 may generate one or more control signals 130 indicative of increasing or decreasing the output voltage 108 based on receiving the feedback signals 122, the feedforward signals 126, or both. The controller 124 may provide the control signals 130 to the voltage DAC 104, the current DAC 106, or both. The voltage DAC 104 and the current DAC 106 may control the voltage level of the output voltage 108 based on controlling a voltage and a current of the flipped voltage follower 102 respectively, as will be appreciated.

In the depicted embodiment, the flipped voltage follower 102 may include a cascode configuration of switches. The switches may include an output device 132, a passing device 134, and a gate device 136 that receive a reference voltage 138 ($V_{REF}$). In the depicted embodiment, the output port 110 may be disposed between the passing device 134 and the output device 132. The output device 132, the passing device 134, and/or the gate device 136 may each include a transistor, a field-effect transistor (FET), or any other viable switching circuit, adjustable resistance circuit, and/or controllable current gain circuit.

In the depicted embodiment, a first side (e.g., a source) of the passing device 134 and a first side (e.g., a drain) of the gate device 136 may receive the reference voltage 138. The gate device 136 may activate a gate of the passing device 134 upon receiving a cascode voltage 140 (e.g., upon saturation). In particular, a gate of the passing device 134 may receive a gate voltage from a second side (e.g., a source) of the gate device 136 when the gate device 136 is receiving the cascode voltage 140 (e.g., is saturated). In some cases, the gate device 136 may receive the cascode voltage 140 when the LDO 60 is activated. In different cases, the cascode voltage 140 may be different based on a saturation voltage of the gate switch. For example, the cascode voltage may be similar to the reference voltage.

When the passing device 134 is activated, the output device 132 may generate a quantized output voltage 108 based on the control signals 130 provided by the controller 124. In particular, the voltage DAC 104 may provide a quantized gate voltage 142 ($V_G$) to a gate of the output device 132 to control the output voltage 108 based on receiving the control signals 130. Moreover, the current DAC 106 may control a current flow through the output device 132 to a ground connection 144 to control the output voltage 108 based on receiving the control signals 130. For example, when the passing device 134 is activated, the output voltage 108 ($V_{out}$) may be determined by Equation I below where $V_{GS}$ may be a voltage difference between the gate and the source of the output device 132:

$$V_{out} = V_G + V_{GS} \qquad \text{(Equation 1)}$$

The voltage DAC 104 may include a multiplexer 146 (e.g., an analog multiplexer) and a resistor string 148 that receives the reference voltage 138 to provide the gate voltage 142. Although in the depicted embodiment the resistor string 148 receives the reference voltage 138, in alternative or additional embodiments, the resistor string 148 may receive a different voltage. In any case, the resistor string 148 may include multiple resistors 150. The multiplexer 146 may couple to one of the resistors 150 based on receiving the control signals 130. For example, the controller 124 may provide the control signals 130 to the multiplexer 146 indicative of coupling to one of the resistors 150. The multiplexer 146 may provide a different gate voltage 142 based on coupling to a different resistor 150 or combination of resistors 150 of the resistor string 148. Accordingly, the multiplexer 146 may provide the gate voltage 142 (or the quantized gate voltage 142) based on receiving the control signals 130. For example, the multiplexer 146 may provide different gate voltages 142 with voltage levels in an active or saturation region of the output device 132.

The current DAC 106 may include multiple switching circuits 152. The switching circuits 152 may include any suitable circuit component (e.g., a transistor) coupled between the flipped voltage follower 102 and the ground connection 144 that may perform switching functionality. Moreover, each of the switching circuits 152 may pass-through an amount of current (e.g., a limited amount of current) when closed (e.g., saturated). The current DAC 106 may open (e.g., activate) or close (e.g., deactivate) each of the switching circuits 152 based on receiving the control signals 130. Accordingly, the current DAC 106 may control an amount of current of the flipped voltage follower 102 grounded to the ground connection 144. For example, the control signals 130 may cause the switching circuits 152 to close to increase the current flow through the flipped voltage follower 102 and increase the output voltage 108. Alternatively, the control signals 130 may cause the switching circuits 152 to open to decrease the current flow through the flipped voltage follower 102 and decrease the output voltage 108.

Opening and closing the switching circuits 152 may change the voltage level of the output voltage 108 with a higher level of granularity compared to changing the gate voltage 142 of the output device 132. In any case, in the depicted embodiment, when the passing device 134 is activated (e.g., saturated), the output voltage 108 ($V_{out}$) may be determined by Equation 2 below. In particular, the controller 124 may operate the multiplexer 146 and the switching circuits 152 to generate a target or desired output voltage 108 of the LDO 60 based on Equation 2. In Equation 2, $I_1$ represents a current passing through the gate device 136, $I_2$ is a current passing through (e.g., or is being grounded by) the current DAC 106, $VT_{Mflip}$ is a threshold voltage of the output device 132, W and L are width and length, respectively, of a conductive portion of the output device 132, and $\mu$ and $C_{ox}$ each represent a constant value associated with the conductive portion of the output device 132:

$$V_{out} = V_G + VT_{Mflip} + \sqrt{\frac{2*(I2-I1)}{\mu * C_{ox} * \left(\frac{W}{L}\right)_{Mflip}}} \quad \text{(Equation 2)}$$

Figure 6A:
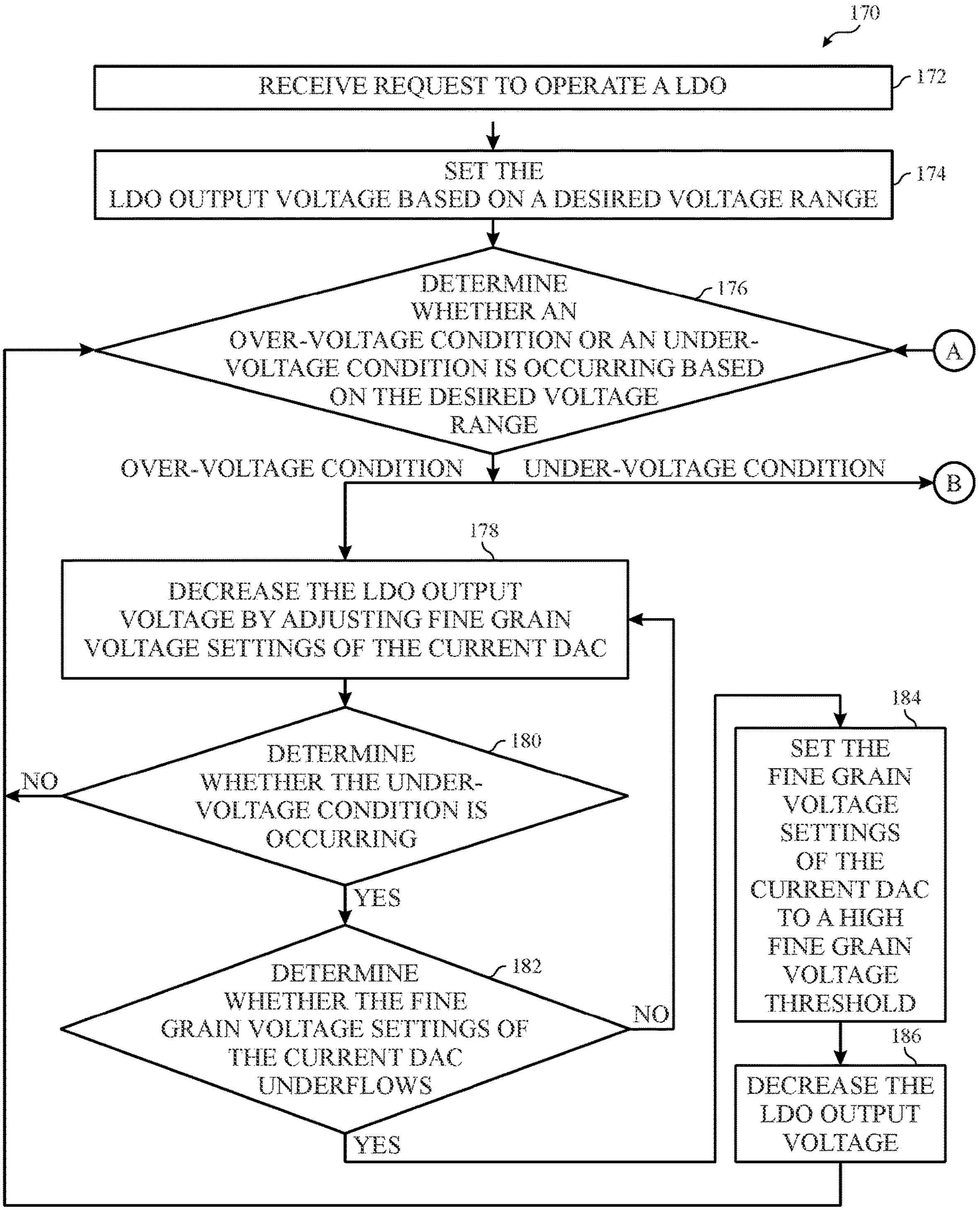
FIGS. 6A and 6B are a flowchart of a process of maintaining an output voltage of the LDO of FIGS. 3, 4, and 5 based on feedback signals, according to embodiments of the present disclosure.
Figure 6B:
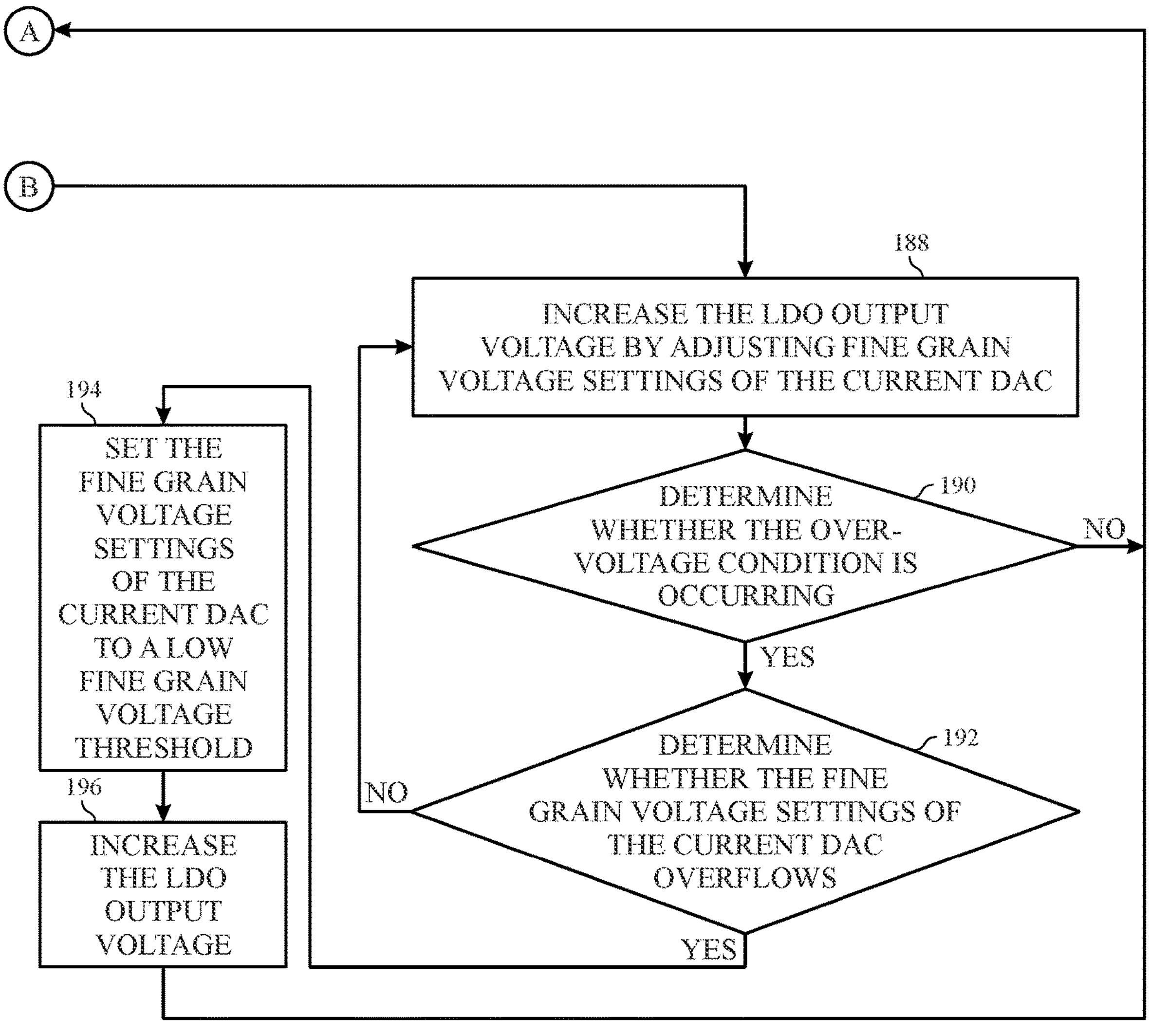

FIGS. 6A and 6B are a process 170 for maintaining the output voltage 108 of the LDO 60 discussed above based on the feedback signals 122. The controller 124 (e.g., as part of the processing circuitry 12 of the electronic device 10) is described to perform the operations associated with process blocks described herein. Although specific blocks are described in the depicted embodiment, it should be appreciated that, in alternative or additional embodiments, the controller 124 may perform alternative or additional processes. Moreover, although the process blocks are described in a particular order, it should be appreciated that the process blocks may be performed in any other viable order.

At block 172, the controller 124 receives a request (e.g., control signals) to operate the LDO 60. The controller 124 may receive the control signals from any suitable processing or controller circuitry to supply the output voltage 108 of the LDO 60 to a target device or component of the electronic device 10. For example, the control signals may include the feedforward signals 126 discussed above.

At block 174, the controller 124 initializes, sets, or starts up the LDO output voltage 108 (or the output voltage 108) based on or to a voltage value within a desired voltage range. In some embodiments, the desired voltage range may correspond to a range of voltage levels between the high voltage threshold 118 and the low voltage threshold 120 discussed above. Moreover, in some embodiments, the controller 124 may provide the control signals to initialize the output voltage 108 based on a ramp rate of the current DAC 106 associated with fine grain voltage adjustment and a ramp rate of the voltage DAC 104 associated with coarse grain voltage adjustment. An embodiment associated with such initialization of the output voltage 108 based on a ramp rate will be discussed below with respect to FIG. 8.

At block 176, the controller 124 determines whether an over-voltage condition or under-voltage condition is occurring. In some embodiments, the controller 124 may determine an over-voltage condition when the output voltage 108 is equal to or above the high voltage threshold 118. Similarly, in some embodiments, the controller 124 may determine an under-voltage condition when the output voltage 108 is equal to or below the low voltage threshold 120. For example, the controller 124 may determine whether the over-voltage condition or under-voltage condition is occurring based on receiving the feedback signals 122.

At block 178, when the over-voltage condition is occurring, the controller 124 decreases the output voltage 108 by (e.g., based on) adjusting fine grain voltage settings of the current DAC 106. For example, in some embodiments, the fine grain voltage settings of the current DAC 106 may include a number of configurable fine grained voltage steps that may be implemented via a number of the switching circuits 152. In such embodiments, the controller 124 may provide control signals to close one or more switching circuits 152 of the current DAC 106 to ground additional current passing through the output device 132 to increase the output voltage 108.

Moreover, the controller 124 may adjust the output voltage 108 using (e.g., based on) the fine grained voltage steps before adjusting the output voltage 108 by using (e.g., based on) coarse grained voltage steps. For example, adjusting the output voltage 108 using the fine grained voltage steps may provide higher level of voltage adjustment granularity. Alternatively or additionally, in specific embodiments, the controller 124 may adjust the output voltage 108 by using the coarse grained voltage steps (and/or fine grained voltage steps) when receiving feedforward signals 126 indicative of such adjustments, as will be discussed below with respect to FIG. 7. An embodiment associated with adjusting the output voltage 108 by adjusting the fine grained voltage steps and the coarse grained voltage steps is discussed below with respect to FIG. 8.

At block 180, the controller 124 determines whether the under-voltage condition is occurring. For example, the comparator circuitry 112 may compare the output voltage 108 to the low voltage threshold 120, and send an indication of the comparison to the controller 124 via the feedback signals 122. The controller 124 may then determine whether the under-voltage condition is occurring based on the feedback signals 122 (e.g., if the feedback signals 122 indicate that the output voltage 108 is equal to or less than the low voltage threshold 120, then the controller 124 may determine that the under-voltage condition is occurring). The controller 124 may return to block 176 to determine whether an over-voltage condition or under-voltage condition is occurring when the under-voltage condition is not occurring. The controller 124 may proceed to block 182 when the under-voltage condition is occurring.

At block 182, the controller 124 may determine whether the fine grain voltage settings of the current DAC 106 underflows (e.g., based on a low fine grain voltage threshold). In specific embodiments, the fine grain voltage settings of the current DAC 106 may underflow when the controller 124 closes some or all the switching circuits 152 of the current DAC 106 to increase the output voltage 108. The controller 124 may return to block 178 to decrease the output voltage 108 based on adjusting the fine grain voltage settings when the fine grain voltage settings are not underflowing. The controller 124 may proceed to block 184 when the fine grain voltage settings are underflowing.

At block 184, the controller 124 sets the fine grain voltage settings of the current DAC 106 to a high fine grain voltage threshold. For example, the high fine grain voltage threshold may correspond to opening or closing all or a number of switching circuits 152 of the current DAC 106.

At block 186, the controller 124 may decrease the output voltage 108 (e.g., by or based on adjusting coarse grain voltage settings of the voltage DAC 104). For example, the controller 124 may provide control signals to the voltage DAC 104 to adjust the coarse grain voltage settings. As discussed above, adjusting the coarse grain voltage settings may be based on coupling the multiplexer 146 to a different resistor 150 of the resistor string 148. As such, the multiplexer 146 may provide the gate voltage 142 with a lower voltage level to decrease the output voltage 108. The controller 124 may proceed to operations of block 176.

At block 188, when the under-voltage condition is occurring, the controller 124 increases the output voltage 108 by adjusting the fine grain voltage settings of the current DAC 106. For example, the controller 124 may provide control signals to close one or more switching circuits 152 of the current DAC 106 to increase the current passing through the output device 132 to the ground connection 144 and increase the output voltage 108.

At block 190, the controller 124 determines whether the over-voltage condition is occurring. For example, the comparator circuitry 112 may compare the output voltage 108 to the high voltage threshold 118, and send an indication of the comparison to the controller 124 via the feedback signals 122. The controller 124 may then determine whether the over-voltage condition is occurring based on the feedback signals 122 (e.g., if the feedback signals 122 indicate that the output voltage 108 is equal to or higher than the high voltage threshold 118, then the controller 124 may determine that the over-voltage condition is occurring). The controller 124 may return to block 176 to determine whether an over-voltage condition or under-voltage condition is occurring when the over-voltage condition is not occurring. The controller 124 may proceed to block 192 when the under-voltage condition is occurring.

At block 192, the controller 124 determines whether the fine grain voltage settings of the current DAC 106 overflows (e.g., based on a high fine grain voltage threshold). In specific embodiments, the fine grain voltage settings of the current DAC 106 may overflow when the controller 124 closes all the switching circuits 152 of the current DAC 106 to increase the output voltage 108. As such, the controller 124 may return to block 188 to increase the output voltage 108 by adjusting the fine grain voltage settings when the fine grain voltage settings is not overflowing. The controller 124 may proceed to block 194 when the fine grain voltage settings is overflowing.

At block 194, the controller 124 sets the fine grain voltage settings of the current DAC 106 to a low fine grain voltage threshold. For example, the low fine grain voltage threshold may correspond to closing all or a number of switching circuits 152 of the current DAC 106.

At block 196, the controller 124 increases the output voltage 108 (e.g., by or based on adjusting the coarse grain voltage settings of the voltage DAC 104). For example, the controller 124 may provide control signals to the voltage DAC 104 to couple the multiplexer 146 to a different resistor 150 of the resistor string 148. As such, the multiplexer 146 may provide the gate voltage 142 with a higher voltage level to increase the output voltage 108. The controller 124 may proceed to operations of block 176.

As shown in the example embodiment of the process 170, the controller 124 may perform the operations described above in a loop. In particular, the controller 124 may perform the process 170 to initialize and maintain the output voltage 108 of the LDO 60 between the high voltage threshold 118 and the low voltage threshold 120. The LDO 60 may utilize alternative or additional processes based on operations of the circuitry described above. For example, the LDO 60 may perform additional processes based on receiving the feedforward signals 126.

Figure 7:
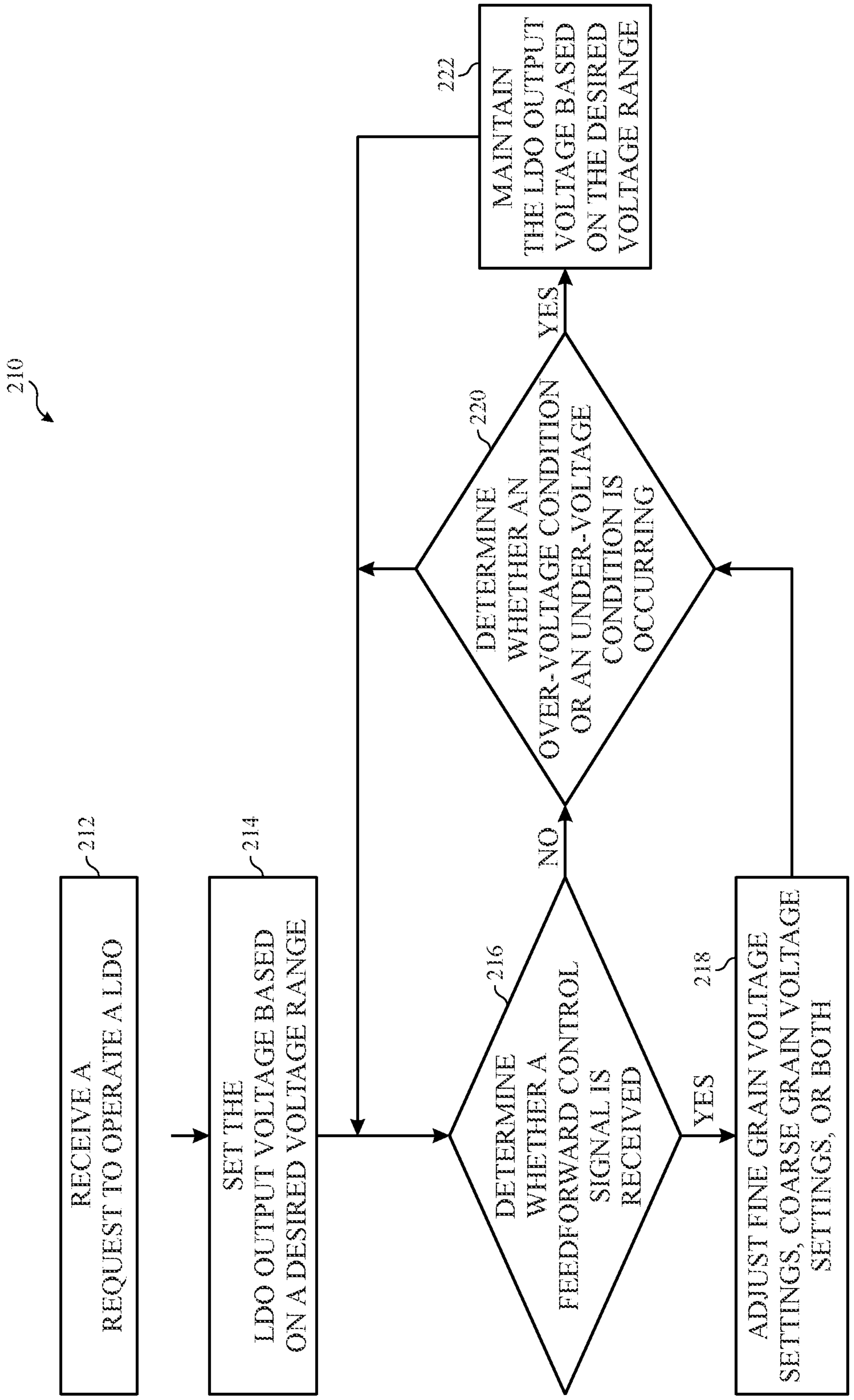
FIG. 7 is a flowchart of a process of maintaining an output voltage of the LDO of FIGS. 3, 4, and 5 based on feedback signals and feedforward signals, according to embodiments of the present disclosure.

FIG. 7 is a process 210 for maintaining the output voltage 108 of the LDO 60 discussed above based on receiving the feedback signals 122 and the feedforward signals 126. The controller 124 is described to perform the operations associated with process blocks described herein. Although specific blocks are described in the depicted embodiment, it should be appreciated that in alternative or additional embodiments, the controller 124 may perform alternative or additional processes. Moreover, although the process blocks are described in a particular order, it should be appreciated that the process blocks may be performed in any other viable order.

At block 212, the controller 124 receives a request to control the LDO 60. Receiving the request may include receiving the control signals indicative of initializing the LDO 60 to a voltage value within a desired voltage range. The controller 124 may receive the control signals from any viable processing or controller circuitry. For example, the control signals may include the feedforward signals 126 discussed above.

At block 214, the controller 124 may initialize the LDO output voltage 108 (or the output voltage 108) based on or to a voltage value within the desired voltage range. The voltage range may correspond to the range of voltage levels between the high voltage threshold 118 and the low voltage threshold 120. In some embodiments, the controller 124 may provide the control signals to initialize the output voltage 108 based on a ramp rate of the current DAC 106 associated with fine grain voltage adjustment and a ramp rate of the voltage DAC 104 associated with coarse grain voltage adjustment. An embodiment associated with such initialization of the output voltage 108 based on a ramp rate will be discussed below with respect to FIG. 8.

At block 216, the controller 124 determines whether feedforward signals 126 are received. For example, the controller 124 may determine whether the feedforward signals 126 are received in response to checking at a time interval, receiving the control signals indicative of initializing or setting the output voltage 108 of the LDO 60, receiving the feedforward signals 126, or a combination thereof, among other things. In any case, the controller 124 may proceed to block 218 in response to determining that the feedforward signals 126 are received and may proceed to block 220 in response to determining that the feedforward signals 126 are not received.

At block 218, the controller 124 adjusts the fine grain voltage settings, coarse grain voltage settings, or both (e.g., based on the feedforward signals 126). For example, the controller 124 may skip at least a portion of the ramp rate associated with the fine grain voltage settings and/or coarse grain voltage settings mentioned above and described below with respect to FIG. 8 based on the feedforward signals 126. In some embodiments, the controller 124 may return to operations of the block 216 based on adjusting the output voltage 108 by adjusting the fine grain voltage settings, coarse grain voltage settings, or both. Alternatively or additionally, the controller 124 may adjust the high voltage threshold 118, the low voltage threshold 120, or both (e.g., based on a voltage buffer) based on the feedforward signals 126. In any case, in the depicted embodiment, the controller 124 may proceed to the block 220 to compensate for over-voltage or under-voltage conditions.

At block 220, the controller 124 determines whether an over-voltage condition or under-voltage condition is occurring. In some embodiments, the controller 124 may determine an over-voltage condition when the output voltage 108 is equal to or above the high voltage threshold 118. Similarly, in some embodiments, the controller 124 may determine an under-voltage condition when the output voltage 108 is equal to or below the low voltage threshold 120. For example, the controller 124 may determine whether the over-voltage condition or under-voltage condition is occurring based on receiving the feedback signals 122. In some cases, the controller 124 may return to operations of the block 216 when no over-voltage condition or under-voltage condition is determined.

In other cases, the controller 124 may proceed to operations of the block 222 when over-voltage condition or under-voltage condition is determined. At block 222, the controller 124 maintains the output voltage 108 of the LDO 60 based on the desired voltage range. As mentioned above, the desired voltage range may include voltage levels higher than the low voltage threshold 120 and lower than the high voltage threshold 118. Moreover, maintaining the output voltage 108 of the LDO 60 based on the desired voltage range may include performing any viable process including at least some of the processes of the blocks 178, 180, 182, 184, 186, 188, 190, 192, 194, and 196 of the process 170 described above with respect to FIGS. 6A and 6B. In any case, the controller 124 may return to operations of the block 216 based on performing such operations.

Figure 8:
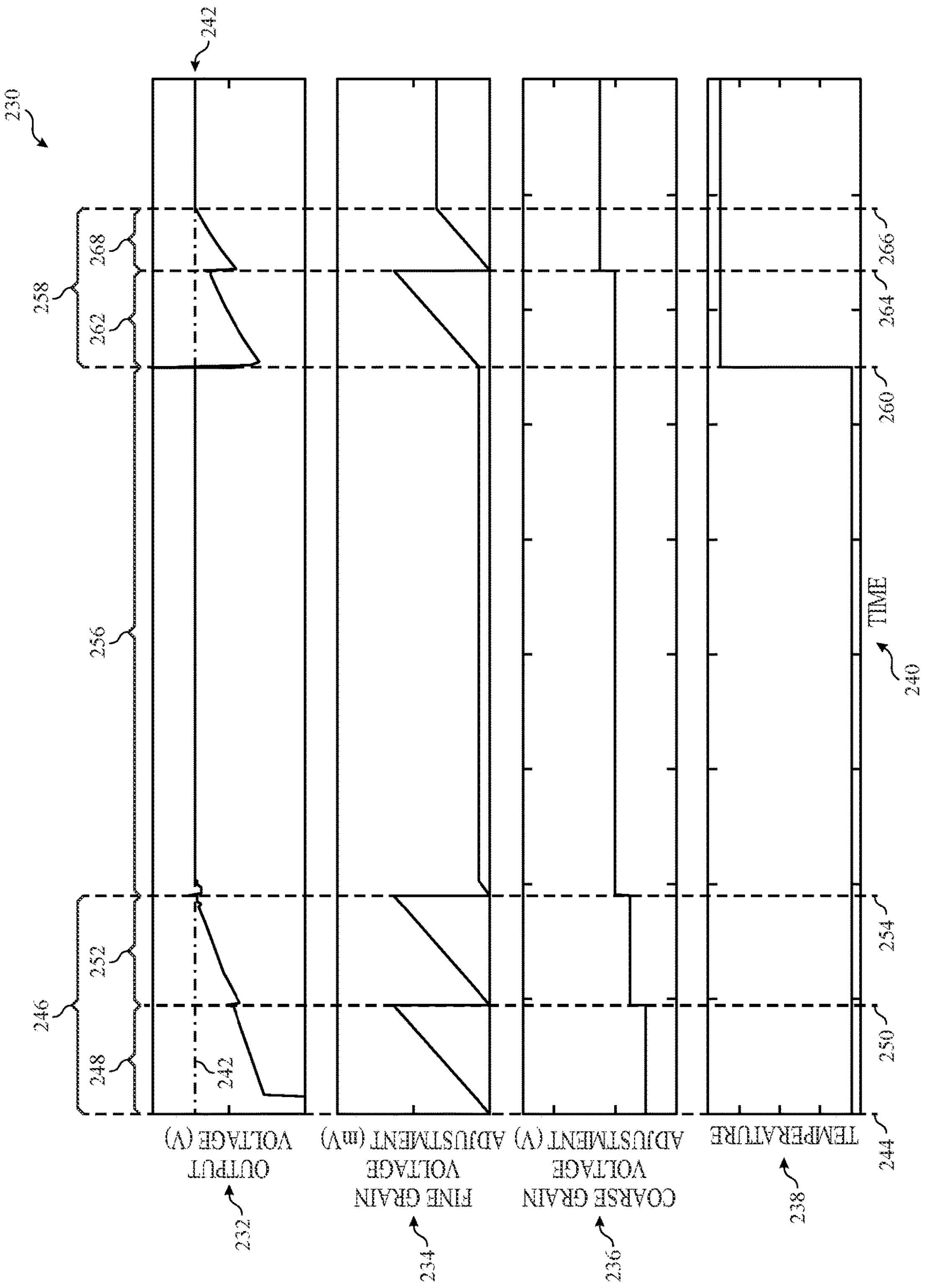
FIG. 8 is a set of graphs depicting an example output voltage of the LDO of FIGS. 3, 4, and 5 based on fine grain voltage adjustment and coarse grain voltage adjustment, according to embodiments of the present disclosure.

FIG. 8 is a set of graphs 230 depicting an example of ramping up and maintaining the output voltage 108 of the LDO 60 based on fine grain voltage adjustment and coarse grain voltage adjustment. In particular, the set of graphs 230 may include an output voltage graph 232, a fine grain voltage adjustment graph 234, a coarse grain voltage adjustment graph 236, and a temperature graph 238. The output voltage graph 232 may depict a voltage level of the output voltage 108 over time 240. The fine grain voltage adjustment graph 234 may depict a voltage level adjustment (e.g., in mV, in microvolts, and so on) of the output voltage 108 based on operations of the current DAC 106 over the time 240 (e.g., in seconds, in milliseconds, and so on). The coarse grain voltage adjustment graph 236 may depict a voltage level adjustment (e.g., in volts, in mV, and so on) of the output voltage 108 based on operations of the voltage DAC 104 over the time 240. Moreover, the temperature graph 238 may depict a temperature (e.g., in Celsius (C)) associated with the LDO 60 over the time 240.

In some embodiments, similar to the blocks 172 and 212 described above, the controller 124 may receive a request (e.g., control signals) to initialize or set the output voltage 108 of the LDO 60 to or based on a desired voltage 242. For example, the desired voltage 242 may be within the desired voltage range discussed above. The controller 124 may provide control signals to the current DAC 106 and the voltage DAC to ramp up the output voltage 108. For example, at a time 244, the output voltage 108 may be initially zero volts, near zero volts, or near or at a reference voltage (e.g., to which the desired output voltage 108 may be compared). At a time period 246, the current DAC 106 and the voltage DAC 104 may ramp up the output voltage 108 to the desired voltage 242.

At a time period 248, the current DAC 106 may close a number of the switching circuits 152 to step up the output voltage 108. At a time 250, the current DAC 106 may experience an overflow condition. For example, the controller 124 may determine the overflow condition based on operations of the blocks 176, 190, 218, 220, and/or 222 of processes 170 and/or 210 of the FIGS. 6 and 7 discussed above. As such, the voltage DAC 104 may step up (e.g., increase) the output voltage 108 based on stepping up the gate voltage 142 at time 250. For example, the controller 124 may provide the control signals to the voltage DAC 104 based on operations of the blocks 196, 218, and/or 220 of processes 170 and/or 210 of the FIGS. 6 and 7 discussed above. In particular, the controller 124 may adjust the output voltage 108, determine an under-voltage or over-voltage condition, among other things.

At a time period 252, the current DAC 106 and the voltage DAC 104 may perform a similar operation to the time period 248. In the depicted example, at a time 254, the LDO 60 may attain the desired voltage 242 at the output voltage 108. During a time period 256, the LDO 60 may provide the desired voltage 242 at the output voltage 108. In some embodiments, at the time period 258, the controller 124 may adjust the output voltage 108, determine an under-voltage or over-voltage condition, among other things, by providing the control signals. As such, the controller 124 may determine whether feedback signals 122 and/or feedforward signals 126 indicate performing additional operations by performing, for example, operations of the blocks 176, 216, and/or 220 of the processes 170 and/or 210.

At a time 260, as shown in the temperature graph 238, the temperature of the LDO 60 may change by a number of degrees (e.g., 10 degrees C. 25 degrees C. 50 degrees C., and so on). As such, the output voltage 108 may change (e.g., increase, decrease, fluctuate) based on the change in the temperature at the time 260. Alternatively or additionally, the output voltage 108 may increase based on a change in additional or alternative variables associated with the LDO 60.

In any case, the current DAC 106 and the voltage DAC 104 may compensate for the increase, decrease, and/or fluctuations in the output voltage 108 during a time period 262. In particular, at the time period 262, the current DAC 106 may close a number of the switching circuits 152 to step up the output voltage 108. At a time 264, the current DAC 106 may experience an overflow condition. For example, the controller 124 may determine the overflow condition based on operations of the blocks 176, 190, 218, 220, and/or 222 of processes 170 and/or 210 of the FIGS. 6 and 7 discussed above. As such, the voltage DAC 104 may step up the output voltage 108 based on stepping up the gate voltage 142 at time 264. For example, the controller 124 may maintain the output voltage 108 of the LDO 60 based on a desired output voltage or voltage range by providing the control signals to the voltage DAC 104 based on operations of the blocks 196, 218, and/or 220 of processes 170 and/or 210 of the FIGS. 6 and 7 discussed above.

At a time period 268, the current DAC 106 may close an additional number of the switching circuits 152 to step up the output voltage 108. As such, at time 266 and/or also time period 268, the output voltage may attain the desired output voltage 108. Accordingly, at least in some cases, the LDO 60 may provide a stable output voltage by compensating for variations such as temperature, process, among other variations. Such stability of output signals may be appreciated at high speed digital circuits (e.g., the DAC 62, the modulator 64, the PA 66, the LNA 82, the demodulator, the ADC 88, among other things). In some cases, the LDO 60 may also occupy a smaller amount of space based on using digital circuitry (e.g., the controller 124) as compared to analog circuitry.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A low dropout voltage regulator circuit, comprising:

flipped voltage follower circuitry comprising a first device configured to provide an output voltage of the low dropout voltage regulator circuit;

a first digital-to-analog converter (DAC) comprising a multiplexer coupled to the first device of the flipped voltage follower circuitry, a second DAC comprising a plurality of switches configured to couple and uncouple the first device and a ground connection; and voltage regulation circuitry coupled to the multiplexer, the plurality of switches, and the first device.

2. The low dropout voltage regulator circuit of claim 1, wherein the flipped voltage follower circuitry comprises a plurality of devices arranged in cascode configuration, the plurality of devices comprising the first device.

3. The low dropout voltage regulator circuit of claim 1, wherein the first device comprises a transistor, and wherein the multiplexer is coupled to a gate of the transistor.

4. The low dropout voltage regulator circuit of claim 1, wherein the multiplexer is configured to provide a gate voltage to the first device by coupling to a resistor of a plurality of resistors of the first DAC.

5. The low dropout voltage regulator circuit of claim 1, wherein a source of the first device is coupled to an output port of the low dropout voltage regulator circuit and each switch of the plurality of switches is configured to couple and uncouple a second side of the first device and the ground connection.

6. The low dropout voltage regulator circuit of claim 1, wherein the voltage regulation circuitry comprises a controller configured to operate at least one of the first DAC and the second DAC to adjust the output voltage.

7. The low dropout voltage regulator circuit of claim 6, wherein the controller causes the multiplexer to couple to a resistor of a plurality of resistors of the first DAC, causes closing or opening one or more of the plurality of switches, or both.

8. The low dropout voltage regulator circuit of claim 1, wherein the voltage regulation circuitry is coupled to a high voltage threshold source and a low voltage threshold source each associated with a desired range of the output voltage.

9. A method comprising:

receiving, by processing circuitry, instructions to set an output voltage of a low dropout voltage regulator circuit to a first voltage;

adjusting, by a current digital-to-analog converter (DAC), a current flow through a flipped voltage follower;

adjusting, by a voltage DAC, an input voltage of the flipped voltage follower; and providing, by the flipped voltage follower, the output voltage at the first voltage.

10. The method of claim 9, wherein adjusting the current flow through the flipped voltage follower comprises closing one or more switches of the current DAC to increase current flow through the flipped voltage follower.

11. The method of claim 9, wherein adjusting the current flow through the flipped voltage follower comprises opening one or more switches of the current DAC to decrease current flow through the flipped voltage follower.

12. The method of claim 9, wherein adjusting the input voltage of the flipped voltage follower comprises coupling a multiplexer of the voltage DAC to a resistor of a plurality of resistors of the voltage DAC.

13. The method of claim 9, comprising instructing the current DAC to increase the current flow through the flipped voltage follower, instructing the voltage DAC to increase the input voltage of the flipped voltage follower, or both to increase the output voltage.

14. The method of claim 9, comprising receiving a feedforward signal indicating setting the output voltage to the first voltage.

15. A radio frequency (RF) transceiver, comprising:

a transmission digital-to-analog converter (DAC) configured to provide analog signals for transmission via one or more antennas based on receiving a supply voltage; and a low dropout voltage regulator circuit comprising flipped voltage follower circuitry configured to provide the supply voltage, a voltage DAC comprising a multiplexer coupled to the flipped voltage follower circuitry, a current DAC comprising a plurality of switches configured to couple and uncouple the flipped voltage follower circuitry and a ground connection, and voltage regulation circuitry coupled to the multiplexer, the plurality of switches, and the flipped voltage follower circuitry.

16. The RF transceiver of claim 15, wherein the low dropout voltage regulator circuit is coupled to a power amplifier, a low noise amplifier, or both of the RF transceiver.

17. The RF transceiver of claim 15, comprising a transmitter, a receiver, or both, coupled to one or more antennas.

18. The RF transceiver of claim 15, wherein the voltage regulation circuitry comprises a controller configured to provide one or more control signals to the voltage DAC, the current DAC, or both, to increase and decrease the supply voltage, wherein the one or more control signals are indicative of coupling the multiplexer to a resistor of a plurality of resistors, closing or opening one or more of the plurality of switches to couple and uncouple the flipped voltage follower circuitry and the ground connection, or both.

19. The RF transceiver of claim 15, wherein the multiplexer is configured to provide a gate voltage to the flipped voltage follower circuitry by coupling to a resistor of a plurality of resistors of the voltage DAC.

20. The RF transceiver of claim 15, wherein the voltage regulation circuitry is coupled to a high voltage threshold source and a low voltage threshold source associated with a desired range of the supply voltage.

* * * * *